Figure 1:
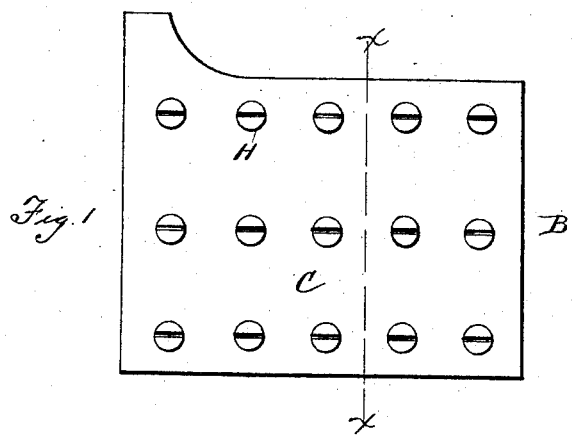

(No Model.)

R. PACKER.
ELECTRODE FOR SECONDARY BATTERIES.

No. 380,922. Patented Apr. 10, 1888.

Witnesses.

Inventor,
Richard Packer
By his Attorney,
Jas. H. Vermilya

UNITED STATES PATENT OFFICE.

RICHARD PACKER, OF CHESTER, PENNSYLVANIA.

ELECTRODE FOR SECONDARY BATTERIES.

SPECIFICATION forming part of Letters Patent No. 380,922, dated April 10, 1888.

Application filed November 7, 1887. Serial No. 254,502. (No model.)

*To all whom it may concern:*

Be it known that I, RICHARD PACKER, of Chester, county of Delaware, State of Pennsylvania, have invented a new and useful Improvement in Electrodes for Secondary Batteries for Storing Electricity, of which the following is a full, clear, and exact description, reference being had to the accompanying drawings, making part of this specification.

My invention relates to improvements in secondary batteries wherein electric energy from a galvanic battery or a dynamo electric machine is stored for future development and use; and it has for its objects, among such other things as are due to its construction, first, to provide an electrode or element which will at all times be concealed and protect the active material thereof, and still be so constructed as to permit the electric current to readily disintegrate through the same to charge the active material, thereby securing a long-sought-for want in this art—namely, an electrode or element of lasting durability and simple and inexpensive construction; and another object of my invention is to so construct the electrode or element that a part of the element itself serves to insulate the same from adjoining electrodes or elements when arranged in series for use in the battery. The first-named of these objects I accomplish by constructing each electrode of two metallic lead plates, which are placed together so that their lateral meeting faces contact with each other, and in these lateral meeting faces of the plates of each electrode is formed a series of cells or indentations, which coincide or register when the plates are secured together.

It is one of the most important and essential features of my invention that the cells or indentations of the plates do not extend entirely through the plates, but only so far therein as to leave a thin wall at that face of the plate which is exposed. The cells or indentations of the plates are filled with active material, and the inner ends of two meeting cells or indentations open into one another, while the outer ends of all the cells are closed by thin integral walls, through which a current from a galvanic battery or a dynamo-electric machine can readily disintegrate to charge the active material concealed between the two plates of the electrode. It will thus be seen that the active material of the electrode or element is held or clamped between two flat plates of lead, so that said material is at all times concealed, and the durability of the electrode is very materially increased.

The cells or indentations of the metallic plates are arranged in series, which are separated at suitable intervals to provide solid portions between the cells, and through these solid portions of the plates are formed transverse threaded openings, in which are fitted screws which securely unite the two plates together. The screws are made of insulating material— preferably hard rubber—and the extremities of the screws project beyond the exposed faces of the electrode so that they come in contact with the adjoining electrodes of the battery, and thereby prevent the metallic plates of the electrodes from contacting and completely insulating the electrodes from one another by devices which themselves form part of the electrodes.

I will now proceed to describe my invention in connection with the accompanying drawings, in which—

Figure 3:
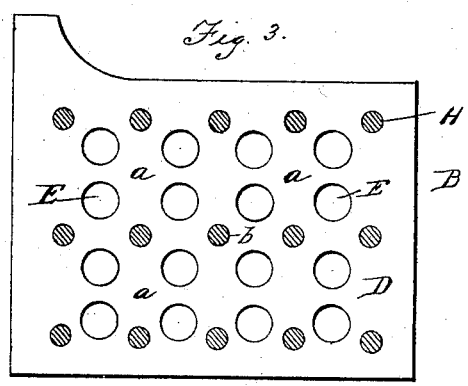
Figure 2:
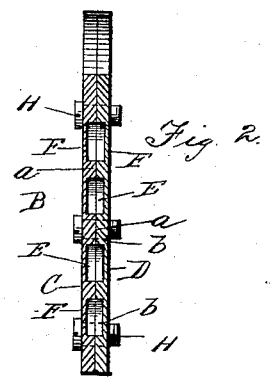
Figure 4:
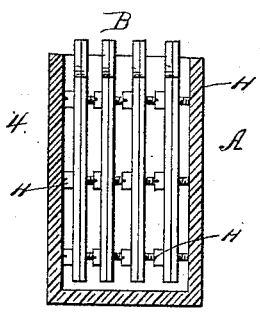

Figure 1 is a side elevation of one of my improved electrodes for secondary batteries. Fig. 2 is a vertical transverse sectional view thereof on the line $x\,x$ of Fig. 1. Fig. 3 is a central longitudinal sectional view of the electrode, and Fig. 4 is a sectional view of a secondary battery with a series of electrodes therein.

Like letters of reference denote corresponding parts in all the figures.

A designates the jar or cell, which contains the solution in which the electrodes or elements B are suspended in the ordinary well-known manner.

Each electrode or element comprises two flat plates, C D, which are united firmly together, with one of the lateral faces of each plate in contact with a corresponding face of the other plate of the electrode, and the edges of the plates are flush with each other, as shown. The meeting faces of the metallic plates C D are provided with a series of cells or indentations, E, which are formed by cutting into the material or lead for a suitable distance to produce cup-like or conical depressions, which do not extend entirely through the plate, but terminate at points a short distance from the lateral exposed surface of the plate, to thereby leave or form a thin integral wall, F, at the outer portion or end of each cell or indentation. The cells are arranged at suitable intervals in series throughout the plates to leave solid portions a, and when the plates are placed together the cells thereof coincide or register and the solid portions a intermediate of the cells of each plate abut together.

A suitable active material is filled in the cells or indentations of the electrode.

Through the solid portions a of the plates C D are formed transverse openings b, which are interiorly screw-threaded, and screws H are fitted in these openings to clamp the plates C D firmly together to conceal and retain the active material between the same. These screws H are made of insulating material—as, for instance, hard vulcanized rubber—and the opposite ends of the screws project beyond the lateral exposed faces of the electrode and are adapted to come in contact with adjoining electrodes, to thereby insulate the same.

The operation and advantages of my invention will be readily understood from the foregoing description, taken in connection with the drawings, by those skilled in the art to which my invention relates.

I lay no claim to an electrode or element consisting of two metallic plates which clamp between them an active material and have transverse perforations that pass entirely through the plates, as I am aware that such a device is not new.

My invention is distinguished from a device of this class in that I close the outer ends of the cells formed between the plates by thin walls, which are formed integral with the plates to thereby conceal and protect the active material and increase the durability of the electrode, and, further, that the plates are firmly united by insulating-screws, which pass through the solid portions of the plates between the cells thereof, and the ends of the screws pass or extend beyond the lateral exposed faces of the plates to insulate the electrodes from one another.

It will be understood that it will not be necessary to have the insulating-screws project beyond the exposed faces of every electrode of the battery, as I have found that if the screws of every alternate electrode terminate flush with the lateral faces thereof all of the electrodes of the battery will be insulated from one another, as it is obvious that the two electrodes having the extended screws will insulate the same from the electrode interposed between the terminals of the screws, and which latter electrode has its screws terminating flush therewith.

Having thus fully described my invention, what I claim as new, and desire to secure by Letters Patent, is—

1. An electrode or element for secondary batteries, consisting of two flat plates laterally united together and having in their opposing lateral faces a series of internal cells for the reception of a suitable active material, the adjacent cells of the two plates aligning to form a continuous cell or pocket transversely through the plates, except at the ends of the cells adjoining the lateral exposed faces of the plates, at which points all the cells are closed by thin walls made integral with the plates, substantially as and for the purpose set forth.

2. An electrode or element for secondary batteries, consisting of two metallic plates having a series of cells or indentations formed in the meeting faces thereof for the reception of active material, and so arranged as to leave solid portions intermediate of the cells, in which solid portions threaded openings are formed, and screws fitted in the openings to firmly unite the plates together, substantially as described.

3. An electrode or element for secondary batteries, consisting of two metallic plates having cells or indentations formed in the meeting faces thereof to receive active material, and which cells extend only partially through the plates to form an integral wall at one end of the cells, and devices for firmly uniting the plates together, substantially as described.

4. An electrode or element for secondary batteries, consisting of metallic plates having internal cells or depressions in the meeting faces thereof, and insulating-screws passed through the plates and having one or both ends extended beyond the vertical exposed faces of the plates, substantially as described, for the purpose set forth.

In testimony whereof I have hereunto set my hand this 4th day of November, A. D. 1887.

RICHARD PACKER.

Witnesses:
 JOHN T. LEIPER,
 J. WALTER LINDSAY.